Aug. 4, 1942.  A. W. LEMMON  2,291,733
TAKE-UP MECHANISM FOR CONVEYER APPARATUS
Filed Jan. 25, 1941   2 Sheets-Sheet 1
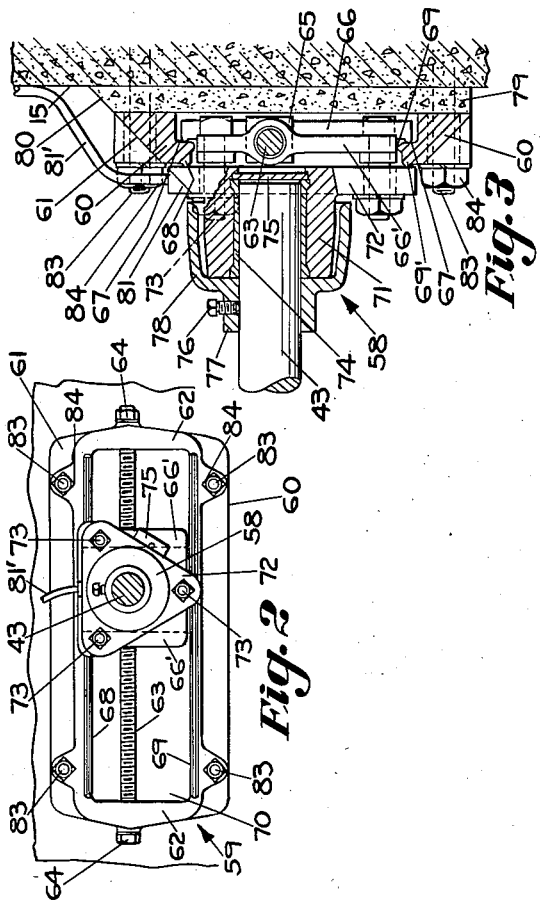
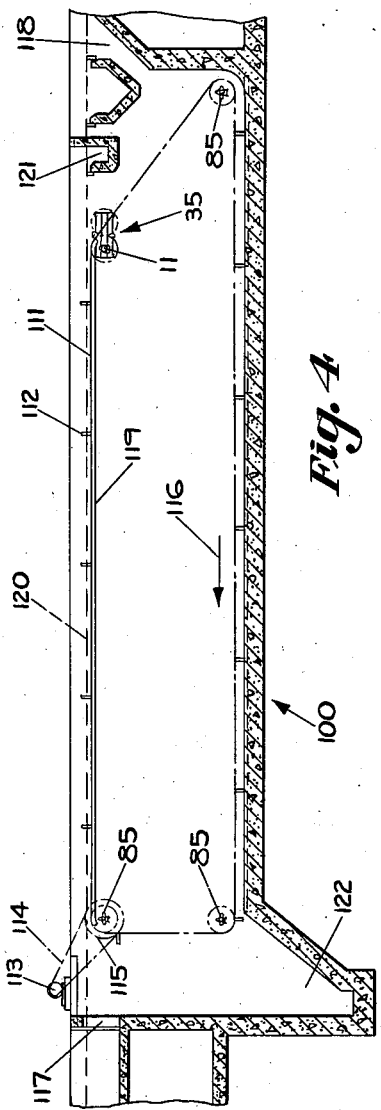
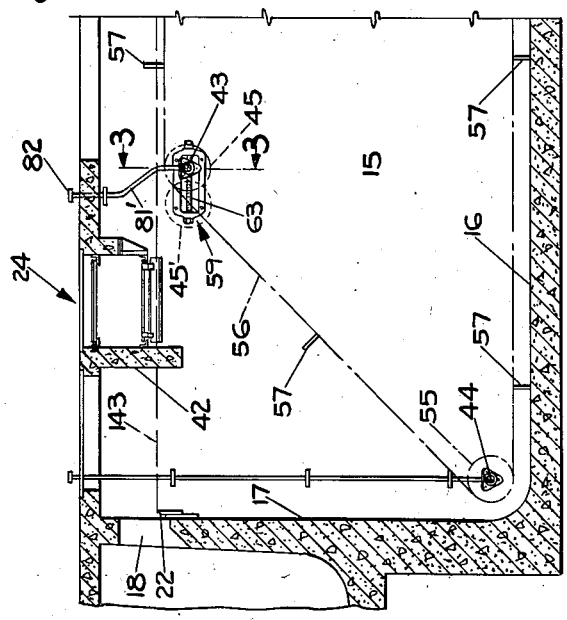
INVENTOR:
ALEXIS W. LEMMON,
By Chas. M. Nissen,
ATT'Y.

Aug. 4, 1942. A. W. LEMMON 2,291,733
TAKE-UP MECHANISM FOR CONVEYER APPARATUS
Filed Jan. 25, 1941 2 Sheets-Sheet 2
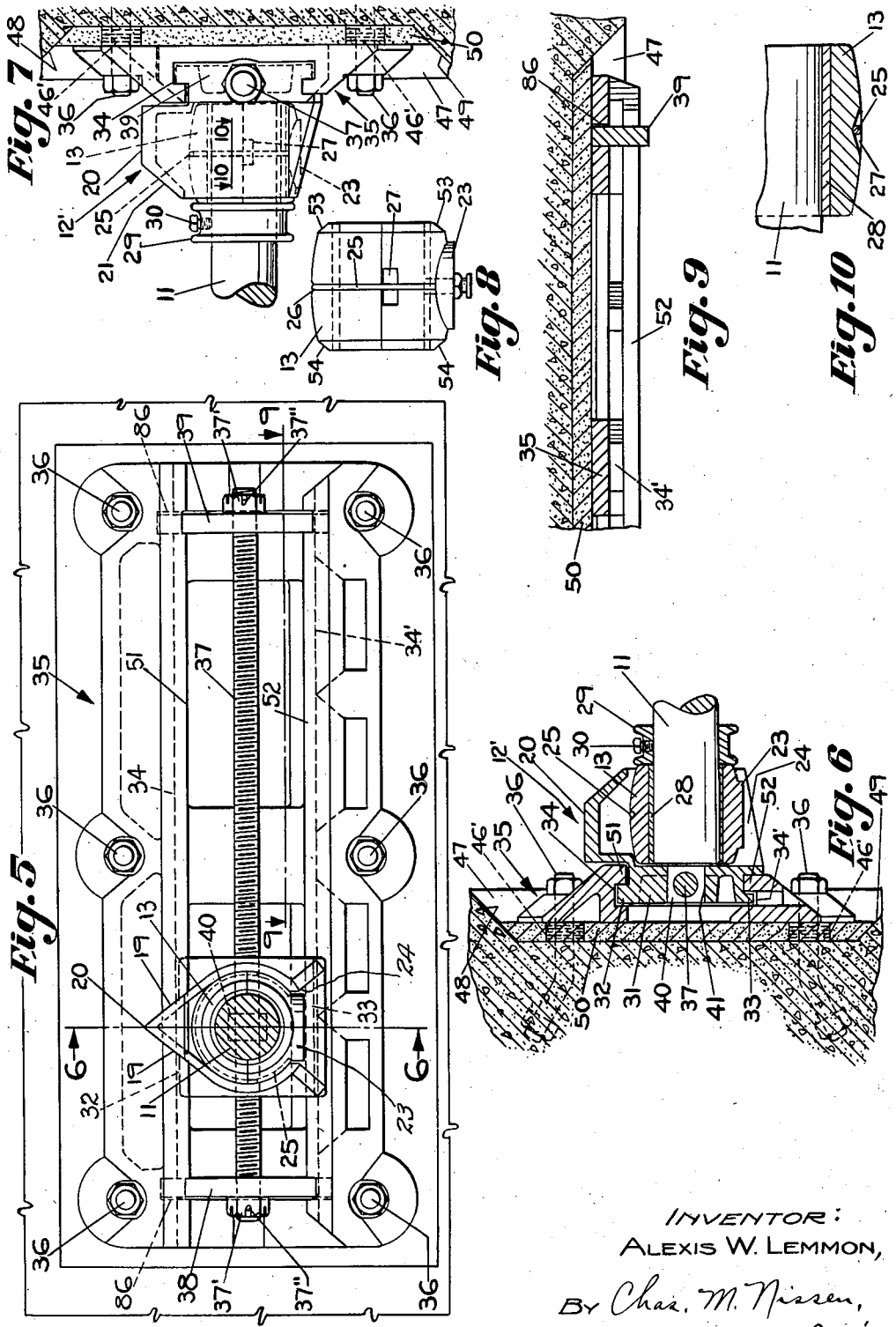
INVENTOR:
ALEXIS W. LEMMON,
By Chas. M. Nissen,
ATT'Y.

Patented Aug. 4, 1942

2,291,733

UNITED STATES PATENT OFFICE 2,291,733

TAKE-UP MECHANISM FOR CONVEYER APPARATUS

Alexis W. Lemmon, Columbus, Ohio, assignor to The Jeffrey Manufacturing Company, a corporation of Ohio Application January 25, 1941, Serial No. 375,962

14 Claims. (Cl. 308—59)

This invention relates to take-up mechanism for conveyer apparatus particularly adapted for use in sewage disposal plants, and one of the objects of the invention is the provision of improved take-up mechanism adapted to be mounted on the inner walls of a sedimentation tank in such a manner as to reduce the collection of sediment on conveyer shaft bearings to a minimum.

Another object of the invention is the provision of inclined sediment shedding surfaces on take-up mechanism for conveyer shaft bearings at the inner opposing walls of a sedimentation tank.

A further object of the invention is an improved method of assembly of take-up mechanism for conveyer shafts and the mounting of the take-up mechanism on the inner opposing walls of a sedimentation tank in accordance with the lengths of the conveyer shafts.

Other objects of the invention will appear hereinafter, the novel features and combinations being set forth in the appended claims.

In the accompanying drawings,

Fig. 1 is a longitudinal vertical sectional view of a portion of a sedimentation tank for sewage disposal apparatus comprising one form of my invention;

Fig. 2 is an enlarged elevational view of the chain tensioning or take-up mechanism included in the conveyer apparatus comprising my invention;

Fig. 3 is an enlarged sectional view taken on the line 3—3 of Fig. 1 looking in the direction of the arrows;

Fig. 4 is a longitudinal vertical sectional view of a sedimentation tank for sewage disposal apparatus comprising another form of my invention;

Fig. 5 is an elevational view of the bearing associated with take-up mechanism for the chain conveyer apparatus shown in Fig. 4;

Fig. 6 is a sectional elevation taken on the line 6—6 of Fig. 5 looking in the direction of the arrows;

Fig. 7 is an end elevational view of the structure shown in Fig. 5;

Fig. 8 is an elevational view of the journal bearing shown in dotted lines in Fig. 7;

Fig. 9 is a sectional plan view taken on the line 9—9 of Fig. 5; and

Fig. 10 is a sectional plan view taken on the line 10—10 of Fig. 7.

This application includes two forms of take-up mechanism for shafts of conveyer apparatus adapted for use in sedimentation tanks. The form shown in Figs. 1, 2 and 3 has been divided out of my co-pending application S. N. 188,963, filed Feb. 5, 1938, for an improvement in Sewage disposal apparatus, and the form shown in Figs. 4 to 10, inclusive, has been divided out of my co-pending application S. N. 365,026, filed Nov. 9, 1940, for an improvement in Shaft bearing for settling tanks. This application is therefore a continuation in part of both of said applications Serial Nos. 188,963 and 365,026.

Referring particularly to Fig. 1 of the drawings, there is illustrated a portion of a sedimentation tank 14 which may be formed as a monolith of poured concrete comprising opposite inner vertical side walls 15 and bottom 16. Adjacent the effluent end of the tank 14 is the end wall 17 provided with an effluent opening 18 adjacent which is a vertically adjustable liquid level controlling weir 22.

Within the sedimentation tank 14 I provide conveyer apparatus adapted to convey settled sludge by its lower run toward the right as viewed in Fig. 1, and to convey floating scum by its upper run to a cross-scum collector or scum conveyer 24 which co-operates with a baffle 42 extending below the normal liquid level in the sedimentation tank 14, as indicated by the line 143, to insure a complete collection of the scum. The scum conveyer 24 conveys the accumulated scum by positive rectilinear motion up an inclined chute leading to a scum trough.

As shown in Fig. 1, the conveyer apparatus comprises idler shafts 43, 44 which carry intermediate their ends spaced-apart sprockets 45, 55, over which are reeved spaced conveyer chains 56 carrying transversely extending wooden flights 57, 57.

The opposite ends of the idler shafts 43, 44 are supported from the opposing vertical inner faces of the walls 15, 15 of the sedimentation tank by similar bearings, the structure of which is described and claimed in my co-pending application, S. N. 188,963, filed Feb. 5, 1938, for an improvement in Sewage disposal apparatus. A similar bearing 58 is also provided for supporting one end of the shaft 43 as illustrated in Fig. 3 of the drawings.

The idler shaft 43 is supported upon improved chain tensioning take-up apparatus 59, the structure of which will be described more fully hereinafter. It may be mentioned, however, that said chain tensioning apparatus 59 provides for the maintenance of the chains 56 in proper tension by adjustment of the sprocket 45 from the positive position illustrated in Fig. 1 of the drawings, to the dotted line position 45' there illustrated.

Near the influent end of the sedimentation tank 14 a motor is connected to the driving shaft carrying spaced-apart sprockets meshing with the spaced-apart chains 56. Below the driving shaft is another idler shaft carrying sprockets with which the spaced chains 56 mesh so as to guide flights 57 along the bottom 16 of the sedimentation tank.

Referring to Figs. 1, 2 and 3 of the drawings, it will be seen that the chain tensioning devices 59 which are provided at each end of the idler shaft 43, include a bearing construction 58. The chain tensioning device 59 comprises a recessed base plate 60 having a downwardly and inwardly sloping or beveled upper surface 61 for the purpose of shedding sediment. The base plate 60 comprises a pair of spaced end plates 62, 62 in which are journaled the ends of an adjusting screw 63. Nuts 64, 64 are connected to the ends of the screw 63 by means of cotter pins to prevent the screw 63 from being released from its journal bearings in the end plates 62, 62.

The adjusting screw 63 is therefore mounted for free rotation and held by means of the nuts 64, 64 against longitudinal movement relatively to the base plate 60. The adjusting screw 63 is threaded through a nut 65 carried by the plate 66, the front upper and lower edges of which are adapted to slide along the inner guideways 67, 67 of the base plate 60.

The plate 66 is an integral casting having lateral extensions 66', 66'. The back portion of the casting is rectangular in shape as indicated by the dotted lines in Fig. 2, and the vertical dimension of such rectangular portion is greater than the opening between the upper and lower edges 68, 69 of the rectangular opening 70 in the base plate 60. The front portion 66', however, may extend into the opening between the edges 68, 69, as shown in Fig. 3. The lower edge of the portion 66' is therefore adapted to ride along the double beveled guideway 69 as shown in Fig. 3. This arrangement necessitates the casting 66 being inserted into the position shown in Fig. 3 from the rear side of the base plate 60.

The journal bearing 71 shown in section in Fig. 3 has integral therewith the supporting plate 72 which is triangular in shape as shown in Fig. 2.

The three corners of the triangular plate 72 are provided with openings for receiving the bolts 73 which also pass through openings in the lateral extensions 66' of the casting 66, as shown in Fig. 3. Therefore by means of the bolts 73 the triangular plate 72 may be supported by the casting 66 to occupy a position in front of the upper and lower edges 68 and 69 of the opening 70 in the base plate 60. The bolts 73 act as clamps for holding the casting 66 in the position shown in Fig. 3, with the lower edge of the front portion 66' resting on the guideway 69, while the upper and lower edges of the back portion 66 are in engagement with the guideways 67, 67. The backs of the upper and lower edges of the triangular plate 72 ride along the upper and lower double beveled edges 68 and 69'. It should be understood, however, that the bolts 73 serve as adjusting devices because they are adapted to be released when the screw 63 is to be turned in the nut 65 to shift the journal bearing 71 along the base plate 60 in one direction or the other. After adjustment of the journal bearing 71 has been made, the bolts may be re-tightened to clamp the journal bearings 71 securely in adjusted position relative to the base plate 60.

While it is not necessary to clamp the plate 72 to the guideways 67, 67 it is advisable to do so as this will take some of the load off the take-up screw, nuts, etc.

The journal bearing 71 may be provided with a bushing 74, as shown in Fig. 3, and a plate 75 may be inserted in the plate 72 at the inner end of the bushing 74, as shown in Fig. 3, to prevent entrance of foreign material or sediment to the bushing 74; the plate 75 also serves to limit movement of the shaft 43 toward the right as viewed in Fig. 3. Suitable slots may be provided in the plate 72 for receiving the cross-plate 75.

Secured to the shaft 43 by means of the set screw 76 is a hub 77 carrying a cup-shaped shield 78 for surrounding and covering the journal bearing 71 to prevent the accumulation of any sediment on the latter. The journal bearing 71 is stationary while the cup-shaped shield 78 rotates with the shaft 43 during operation of the conveyer apparatus.

With the set screw 76 and the nuts on the bolts 73 released and the cross-plate 75 removed, the journal bearing 71 may be slid along the shaft 43. The casting 66 may be inserted from the back side of the base plate 60 and then the plate 72 may be bolted by means of the bolts 73 to the casting 66, with the base plate 60 rigidly connected to both the casting 66 and the plate 72. After re-insertion of the thrust bearing plate 75 the proper position of the journal bearing 71 may readily be determined and while held in a desired position the grouting 79 may be poured between the base plate 60 and the vertical inner wall 15 of the sedimentation tank. The upper end of the grouting is preferably beveled or sloped downwardly and inwardly as illustrated at 80 in Fig. 3, in alinement with the downwardly and inwardly upper sloping surface 61 of the base plate 60. The upper edge of the plate 72 may likewise be beveled or sloped downwardly and inwardly at 81 in alinement with the sloping surfaces 61 and 80. These alined sloping surfaces are for the purpose of shedding sediment toward the rotatable shield 78 which will by its rotary motion prevent such sediment from accumulating on top of the stationary journal bearing 71.

Extending upwardly through the plate 72 from the interior of the bushing 74 is a lubrication conduit to which is connected the upwardly extending pipe 81'. This is a high pressure lubrication conduit provided with a high pressure fitting 82 adjacent the top of the tank 14 to the end that the journal bearing may be lubricated at any time. The pipe 81' is flexible so as not to interfere with the adjustment of the sprocket 45 from its full line position to its dotted line position 45' shown in Fig. 1.

The base plate 60 is provided with openings to receive the stub bolts 83, 83 which are anchored in the concrete of the vertical wall 15 of the sedimentation tank. By means of nuts 84, 84, the base plate 60 may be secured to the anchor bolts 83. It will thus be seen that the grouting 79 may become firmly attached to the inner wall 15 of the tank but that the base plate 60 may be detached by removing the nuts 84 and drawing the plate 60 away from the bolts 83. This may readily be done after the cross-plate 75 has been removed, the set screw 76 released, and the journal bearing 71 slid along the shaft 43 after the bolts 73 have been released. In other words, by removing the journal bearing 71 and the shaft 43, the plate 60 may be detached from the grouting 79 and the wall 15. It should be understood that this may be desirable when a worn nut 65 is to be renewed, since the casting 66 must be inserted from the rear side of the base plate 69 and can not be inserted in place through the opening 70 from the front side of the base plate 69.

Referring to Fig. 4 it will be seen that the shafts 11 and 85 carry spaced-apart sprockets which mesh with spaced-apart chains to which are attached transverse conveyer flights 112. A motor 113 is connected by a sprocket chain 114 to a sprocket 115 so as to secure operation of the endless conveyer apparatus in the direction of the arrow 116. The sewage enters at the influent opening 117 for flow through the tank 100 toward the right as viewed in Fig. 4, to the effluent opening 118. The upper run of the conveyer 111 moves along the guideway 119 so that the scum floating on the liquid surface 120 will be moved toward the right for flow into the scum trough 121. The lower run of the conveyer 111 moves in the direction of the arrow 116 to cause the flights 112 to scrape the sludge from the bottom of the tank into the sump 122. The ends of the shafts 85 are supported and journaled in housings secured to opposite vertical walls of the tank.

In the form shown in Figs. 5 to 10, inclusive, I have adapted the advantageous features of the self-alining journal bearing supporting mechanism for use in connection with the chain take-up mechanism 30 for the shaft 11 of Fig. 4. In this construction the back plate 31 of the housing 12' has upper and lower horizontal elongated tongues 32 and 33 which fit into and slide along grooves 34, 34' of the wall bracket or frame 35 which is mounted upon the walls of the tank by means of anchor bolts 36, 36.

The opposite walls are provided with recesses 47 preferably beveled at the top and bottom as indicated at 48 and 49 in Figs. 6 and 7. By means of shims 46' or other spacing means, such as sections of lead pipe, the frame 35 may be spaced at the distance desired from the bottom of the recess 47. Grouting 50 may be relied on to fill in the space back of the bracket 35.

End abutment plates 38, 39 beveled at their upper and lower ends are inserted from the back of the frame 35. A relatively long threaded bar 37 is mounted in apertures of these end plates 38, 39 and threaded through the nut 40 held in a slot 41 in the back plate 31. After assembly, the end plates 38, 39 are held rigidly in fixed positions by the concrete grouting 50 and the slots 86, 86 in the bracket or frame 35 into which the plates 38, 39 extend.

The slot 41 is so shaped that rotation of the threaded bar 37 will not cause rotation of the nut 40. Consequently the bearing member 31 will be caused to slide along the frame 35, being guided by the tongue and groove connections 32, 34 and 33, 34'.

The threaded bar 37 is provided at each end with a nut 37' fixed to the bar by a cotter 37'' which prevents longitudinal movement of the threaded bar 37 relatively to the supporting frame 35. By applying a turning tool to either of the nuts 37', the rod 37 may be rotated to effect shifting of the housing 12' horizontally in either direction along the frame 35.

The journal bearing 13 is in general cylindrical in form but larger in diameter at the center than at its ends, as shown in Fig. 6. The journal bearing 13 may be made integral or in one piece or it may be split into sections, as shown in Fig. 8. A boss 23 of cylindrical form projects from the lower section of the journal bearing 13 through a slot 24 in the bottom of the housing 12'. The lateral edges of such slot act as abutments by being engaged by the cylindrical boss 23 to prevent rotary movement of the journal bearings 13 on the axis of the shaft 11 and relatively to the housing 12'.

As shown in Figs. 7 and 8, the journal bearing 13 is split into two halves and held together by a snap ring 25 positioned in the groove 26. This snap ring 25 terminates short a complete circle and therefore the journal bearing may be disassembled by inserting a sharp tool into the groove or recess 27 shown in Fig. 10, and prying the spring 25 from its groove 26.

As stated above, the boss 23 projecting into the opening or slot 24 prevents undue rotation of the journal bearing 13 relatively to the supporting housing 12'. In order to confine the boss 23 to its position in the slot 24 shown in Fig. 6, safety collars 29 are mounted on the shaft 11 in positions to abut the outer ends of the journal bearings 13, and by means of set screws 30, the collars 29 are prevented from moving along the shaft 11 after having been once adjusted to their abutting positions. Endwise or axial movement of the shaft 11 is limited to a very small amount by the front walls of the back plates 31 at the opposite walls in the tank 100.

In order to disassemble the shaft 11 from the housing and the bearings, the safety collars 29 are released and slid along the shaft a sufficient distance to permit the bearings to be moved along the shaft out of the housings 12', whereupon the ends of the shaft may be lowered through the slots 24 of the housings. The journal bearings and the collars 29 may then be slipped from the ends of the shaft. It will thus be seen that the journal bearing may be removed from the supporting housing for renewal of the bushing 28 or for repair, without disturbing the anchoring of the housing on the inner walls of the tank.

It will also be seen that a one piece journal bearing may be as readily removed from the shaft 11 as a sectional journal bearing. Composition renewable split bushings may be included in sectional journal bearings. It should also be noted that whether a one piece journal bearing or sectional journal bearing is used in the housing 12', the space afforded for rocking of the bearing either laterally or up or down prevents any undue stress or strain being thrown on either of the bolts 36 during alinement of the bearings or during operation of the conveyer apparatus 111 shown in Fig. 4.

Fig. 8 is an elevational view of a journal bearing similar to that shown in Figs. 5, 6 and 7, but having the front and rear peripheral edges beveled at 53 and 54 so as to facilitate shedding of sediment which tends to collect on the top of the journal bearing, since the latter is more or less stationary relative to the housing 12' which is immersed in the tank 100. It should also be noted that the triangular inclined face 21 of the housing 12' inclines downwardly and outwardly toward the collar 29. It can readily be seen by referring to Fig. 4 that when sediment is shed from the inclined surface 21 it tends to move toward the collar 29 but the latter is rotating during the operation of the conveyer 111 and therefore produces enough eddy currents to prevent the accumulation of sediment on the adjacent upper side of the journal bearings, and this is particularly true if the journal bearing is provided with the beveled peripheries 53 and 54. The journal bearings are symmetrically shaped so that they may be placed on either end of any shaft and inserted into a housing whether on one wall or the opposite wall.

It should also be noted that the journal bearing 13 fits loosely in the housing 12' so as to have a limited movement relatively thereto on the upright axis of the boss 23. The journal bearing 13 may also have a limited rocking movement relatively to the housing 12' in the vertical plane of the shaft 11. The arrangement therefore constitutes a self-alining bearing which is particularly desirable in connection with the take-up mechanism at the opposite ends of the shaft 11 so that such take-up mechanisms need not be simultaneously operated. The take-up mechanisms may be operated alternately until the slacks in the conveyer chains have been adjusted to be approximately equal.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Shaft supporting mechanism for use in settling tanks comprising an upright wall, an elongated wall bracket bolted thereto, a housing, a journal bearing supported in said housing for limited tilting movements relatively thereto, mechanism preventing rotary movement of said journal bearing relatively to said housing, horizontal tongue and groove guiding connections between said housing and said wall bracket, and nut and screw mechanism between said wall bracket and said housing for adjusting the latter together with said journal bearing horizontally along the wall while such housing is guided by said tongue and groove guiding connections.

2. Shaft supporting mechanism for use in settling tanks comprising an upright wall of concrete, a wall bracket, take-up mechanism comprising spaced-apart supporting blocks insertable into slots in said bracket only from the back thereof, and means comprising grouting for securing said bracket to said wall and for preventing removal of said supporting blocks.

3. Take-up mechanism comprising a wall bracket having spaced apart slots therein, bearing blocks insertable only from the back of said bracket into said slots, a journal bearing support guided along said bracket, means comprising a rotatable screw journaled in said bearing blocks for moving said journal bearing support along said bracket, and means comprising grouting back of said bearing blocks for securing said bracket to an upright wall and serve to lock said bearing blocks in their slots.

4. Take-up mechanism comprising a shallow wall bracket, means for anchoring said wall bracket to an upright wall in a recess therein having upper and lower beveled surfaces, a peak cap housing, a journal bearing in said housing below the peak cap thereof, means for confining the axis of said journal bearing to being at right angles to said upright wall, guiding mechanism between said housing and said wall bracket, and means for moving said housing along said bracket while guided by said guiding mechanism.

5. Take-up mechanism comprising a wall bracket mounted in a recess of an upright wall of a sedimentation tank, said recess being beveled at its lower edge downwardly and inwardly from the wall and said wall bracket having a top surface beveled downwardly and inwardly from such wall, a support, a journal bearing carried by said support, guiding mechanism between said support and said wall bracket, and means for moving said support along said wall bracket while guided by said guiding mechanism.

6. Take-up mechanism comprising the combination with a wall bracket, of horizontal open ended grooved guides on said bracket, a journal bearing support having horizontal tongues insertable into horizontal grooved guides from either end of said bracket, spaced bearing blocks insertable into slots only from the back of said bracket, and means comprising a screw-threaded rod journaled in said bearing blocks and connected to said journal bearing support to adjust the same along said bracket, the connection between the screw-threaded rod and said journal bearing support serving to lock the latter in adjusted position.

7. Take-up mechanism comprising the combination with a wall bracket, of a journal bearing support, interlocking tongue and groove guiding connections between said journal bearing support and said wall bracket, said journal bearing support being insertable from one end of said wall bracket, mechanism comprising an abutment insertable from the back of the bracket in position to limit the travel of the journal bearing support along said bracket, mechanism comprising a screw-threaded rod journaled in said abutment and connected to said journal bearing support to effect adjustment of the journal bearing support when the screw is rotated, and means for securing said bracket to a wall to confine said abutment against removal of said abutment and preventing the removal of the journal bearing support from the bracket past said abutment.

8. Shaft supporting mechanism comprising the combination with a generally flat wall bracket having a top downwardly and inwardly inclined surface closely adjacent the upright plane of an inner wall of a sedimentation tank, of a journal bearing, a plate for supporting said journal bearing with its axis at right angles to said plate, means in a vertical plane for guiding said plate rectilinearly along said wall bracket while confining the said journal bearing axis to remaining at right angles to said wall, a housing for said journal bearing, said housing having top surfaces in intersecting planes each downwardly inclined to shed sediment deposited thereon from the liquid in which said housing is immersed, and mechanism for moving said plate together with said journal bearing and said housing along said wall bracket to effect adjustment of the journal bearing while its axis remains at right angles to the said wall.

9. Take-up mechanism comprising the combination with a generally flat shallow wall bracket, of a journal bearing, a support for said journal bearing, interlocking guiding mechanism between said bracket and said support and occupying planes parallel to the plane of the wall, means comprising anchor bolts partially imbedded in the wall and extending through said wall bracket to secure the latter to the wall, and means comprising a horizontal rotatable screw extending through said support for moving the latter along said bracket, the construction and arrangement being such that so long as said bracket remains anchored to said wall said journal bearing support cannot be removed from said wall bracket.

10. Take-up mechanism comprising the combination with a wall bracket adapted to be secured to an inner upright wall of a sedimentation tank, of a journal bearing, a support for said journal bearing, mechanism in a vertical plane parallel to said upright wall for guiding said support for adjustment along said wall bracket while confining the axis of said journal bearing to positions at right angles to said upright wall, mechanism for moving said support along said bracket while guided by said guiding mechanism, a closure for the journal bearing to prevent sediment from entering the same, and means for mounting said bracket on such wall in such adjusted position thereto as to locate the shaft end adjacent said closure.

11. In apparatus of the class described, the combination with a sedimentation tank having spaced-apart opposite inner upright walls, of supporting brackets mounted on such opposite walls, conveyer apparatus comprising a transverse shaft connected to flexible draft elements, journal bearings for the ends of said shaft, mechanisms for supporting said journal bearings for self-alinement, means for guiding said supporting mechanisms individually along said brackets, and means for individually adjusting said supporting mechanisms to take-up the slack in said flexible draft elements, the self-alining of the bearings enabling such adjustments being made alternately at the opposite walls by a single operator.

12. Shaft supporting mechanism for use in settling tanks comprising an upright wall, an elongated wall bracket secured thereto, a support, guiding connections between said support and said wall bracket, a journal bearing, a housing for said journal bearing, said housing being secured to said support to move bodily therewith, means between said housing and said journal bearing for supporting the latter for limited tilting movements while confined against rotary movement on its own axis relatively to said support, and mechanism between said wall bracket and said support for adjusting the latter together with said housing and said journal bearing along the wall while said support is guided by said guiding connections.

13. Take-up mechanism comprising a wall bracket having vertically spaced-apart horizontal parallel guides connected at their end portions by vertical spaced-apart removable cross-pieces insertable into slots only from the back of said wall bracket, a journal bearing support, retaining mechanism between said support and said wall bracket in association with said guides, means comprising a screw journaled at its end portions in said cross-pieces and extending through said journal bearing support for adjusting the latter while its axis is confined to being at right angles to said journal bearing, and means for securing said bracket to an upright wall with said journal bearing limited in its adjustments along said guides by said cross-pieces serving as abutments.

14. Take-up mechanism comprising the combination with a wall bracket, of a journal bearing, a support for said journal bearing, vertically spaced horizontal guiding connections between said support and said wall bracket, said support being detachably connected to said bracket, spaced abutments carried by said bracket, mechanism comprising a horizontal screw-threaded rod journaled at its ends in said abutments and connected to said support to effect adjustment of the journal bearing when the screw is rotated, and means for securing said bracket to a wall to lock said abutments in positions to confine said support to predetermined limits of movement and prevent removal of the support from said bracket while said bracket is secured to the wall.

ALEXIS W. LEMMON.